United States Patent [19]

Bourhis et al.

[11] 4,279,406

[45] Jul. 21, 1981

[54] PLANT FOR GENERATING AN ATMOSPHERE FOR THE HEAT TREATMENT OF METALS

[75] Inventors: Yves Bourhis, Villejuif; Alain Wermelinger, Fresnes; Michel Kostelitz, Versailles, all of France

[73] Assignee: L'Air Liquide, Societe Anonyme pour l'Etude et l'Exploitation des procedes Georges Claude, Paris, France

[21] Appl. No.: 122,854

[22] Filed: Feb. 20, 1980

[30] Foreign Application Priority Data

Mar. 5, 1979 [FR] France .................. 79 05599

[51] Int. Cl.³ .......................... C21D 11/00
[52] U.S. Cl. ........................ 266/81; 266/82; 266/83; 266/88; 266/89; 266/252; 266/254; 266/257
[58] Field of Search ............... 266/257, 251, 252, 254, 266/81, 82, 83, 87, 88, 89

[56] References Cited

FOREIGN PATENT DOCUMENTS 1150079 1/1958 France .
1189033 9/1959 France .
1242992 10/1960 France .

OTHER PUBLICATIONS

Mouflard et al., Atmospheres de Cementation A Partir D'Azote et de Methanol, Revue de Metallurgie, vol. 58, May 1961.

Primary Examiner—R. Dean
Attorney, Agent, or Firm—Lee C. Robinson, Jr.

[57] ABSTRACT

This invention relates to the generation of an atmosphere for the heat treatment of metals, incorporating an alcohol of the methanol type that decomposes by cracking.

A generating plant comprises a nitrogen circuit connected to a pressure source, an alcohol circuit connected to a pressurized tank containing the alcohol in the liquid phase and an injector arranged to feed the alcohol and nitrogen into the furnace in the form of a mist of alcohol within a jet of nitrogen.

The invention is applicable in particular to the hardening, heating prior to quenching, and annealing of steels.

12 Claims, 2 Drawing Figures

PLANT FOR GENERATING AN ATMOSPHERE FOR THE HEAT TREATMENT OF METALS

BACKGROUND OF THE INVENTION

The present invention relates to a plant for generating an atmosphere intended for at least one furnace for the heat treatment of metals and among other components incorporating an alcohol of the methanol type, i.e. one having the property of decomposing at the temperature of the furnace by cracking of its molecules to yield carbon monoxide and hydrogen. The plant includes feed devices arranged for simultaneously delivering said alcohol under controlled flow in the liquid phase, and at least one other component of said atmosphere in the gaseous phase, and distribution means in communication with said feed devices and with the furnace. Hereinafter such plant will be designated "plant of the kind described".

Atmospheres of this nature are commonly used in the treatment of metals and are applied more particularly for carrying out the steel treatment processes, for example heating prior to tempering, annealing and hardening (carburizing or carbonitriding). A treatment process of this kind is described in French Patent specification No. 73.45,946 and more particularly in its second patent of addition application filed on the Jan. 15, 1979 under the French Pat. No. 79.00,872. French Patent specification No. 73.45,946 corresponds to U.S. Pat. No. 4,035,203 granted July 12, 1977, and French second patent of addition No. 79.00,872 corresponds to U.S. patent application Ser. No. 107,785 filed Dec. 28, 1979. The process makes use of an atmosphere within the furnace which essentially comprises: a carrier gas consisting at least partially of industrially pure nitrogen; a hydrocarbon; hydrogen and carbon monoxide, these last two components originating from methanol decomposition under heat. A process of this nature consequently presupposes the generation of an atmosphere which incorporates methanol prior to the feeding of the atmosphere into the furnace.

French Patent specification No. 1,189,033 had moreover already disclosed a plant for generating an atmosphere partially formed by alcohol, in particular by methanol, arranged for insertion into a heat treatment furnace. However, this plant differed from that forming the object of the aforesaid addition in that it was arranged to produce an alcohol-town gas mixture. The mixture was produced from a constant-level tank itself supplied from a primary tank by means of a pump controlled by a float system.

The application of the process described in the aforesaid French patent of addition application and the different essential conditions of the present application, in particular the need to exclude any trace of oxygen, steam and carbon dioxide in the furnace, necessitated a complete redesign of the plant for generating the atmosphere intended to be fed into the said furnace.

As a matter of fact, the application of atmospheres based on alcohol and nitrogen raises a particular number of problems. One of these problems arises because it is appropriate to provide the feed to the furnace at a constant and strictly controlled rate of delivery, from two ingredients in two physically different states: the one being gaseous (nitrogen) and the other liquid (alcohol). The technique, known per se, for supplying the alcohol from a tank pressurised by means of compressed air has the disadvantage of causing an occulusion of air in the alcohol, and the gas bubbles forming within the liquid mass cause a diphase flow which interfers in the rate of flow measurement. Furthermore, these bubbles increase the risk of feeding oxygen and other impurities into the furnace.

Another problem arises because the alcohol cracking operation should yield solely carbon monoxide and hydrogen (excluding carbon dioxide gas, steam and methane), that is to say that this cracking operation should occur in accordance with the reaction $CH_3OH \rightarrow CO + 2H_2$ in the case of methanol. It is known that this reaction occurs within a particular temperature range of from 700° to 1150° C. for methanol. The vapourisation and cracking of alcohols being endothermic actions, it is of importance that no cold spots should be established within the furnace during infeed of the nitrogen-alcohol mixture, which would lead to a cracking operation generating the aforesaid undesirable products, in particular gaseous carbon dioxide and steam.

It is also appropriate to ensure that the solid impurities which may be present in the alcohol cannot clog the elements for infeed of the nitrogen-alcohol mixture into the furnace.

Thus, it is an object of the invention to provide a solution for the aforesaid problems and to improve plants of the kind described and constituting the prior art.

SUMMARY OF THE INVENTION

To this end, the invention comprises a plant of the kind described in which the feed devices for the alcohol and the gaseous component of the aforesaid atmosphere include at least one nitrogen circuit connected to a source under pressure, the nitrogen forming one of the components of the atmosphere, and at least one alcohol circuit connected to a pressurised tank containing alcohol in the liquid phase and in communication with said nitrogen circuit, the nitrogen acting as a pressurising agent, said nitrogen and alcohol circuits being connected to said feed devices.

The nitrogen circuit forming part of the plant in accordance with the invention, by contrast to known plants, and this for application of the process in accordance with the aforesaid French patent of addition application, is consequently connected to the tank containing the alcohol in the liquid phase, so that it is this very nitrogen which forms the agent pressurising the alcohol. By virtue of the interdependance of the pressure of the two components of the mixture which is to be obtained, this results in a supply at a stable and easily controllable rate of flow of the said mixture, without any risk of feeding into the alcohol circuit any occluded gaseous impurities, in particular oxygen, as is liable to occur with the system utilising compressed air as the pressurising agent.

The aforesaid nitrogen circuit may comprise a pressurising branch connected to the upper part of the alcohol tank via a calibrated nozzle and two valves, one being an inlet valve and the other an outlet valve. The valves are controlled by a pressostat i.e. a device reacting to the hydraulic pressure in the said tank.

A nitrogen circuit pressurising branch of this kind keeps the alcohol tank under a constant pressure and forms a regulator system which is much more efficient and economical than the previously known twin-tank and float systems.

The alcohol circuit may be provided with at least one element for rentention of the solid impurities.

A retention element of this kind prevents clogging of the elements feeding the mixture into the furnace.

Advantageously, the alcohol circuit is provided with at least one bleed element connected to the nitrogen circuit and arranged to vent the nitrogen dissolved in the alcohol towards the nitrogen circuit.

A degassing element of this kind eliminates the occluded nitrogen bubbles which would increase the risk of causing delivery fluctuations, and returns these bubbles to the nitrogen circuit.

BRIEF DESCRIPTION OF THE DRAWINGS

In order that the invention may be more clearly understood, reference will now be made to the accompanying drawings which show certain embodiments thereof by way of example and in diagrammatic form, in which.

DETAILED DESCRIPTION OF THE PREFERRED EMBODIMENTS

Figure 1:
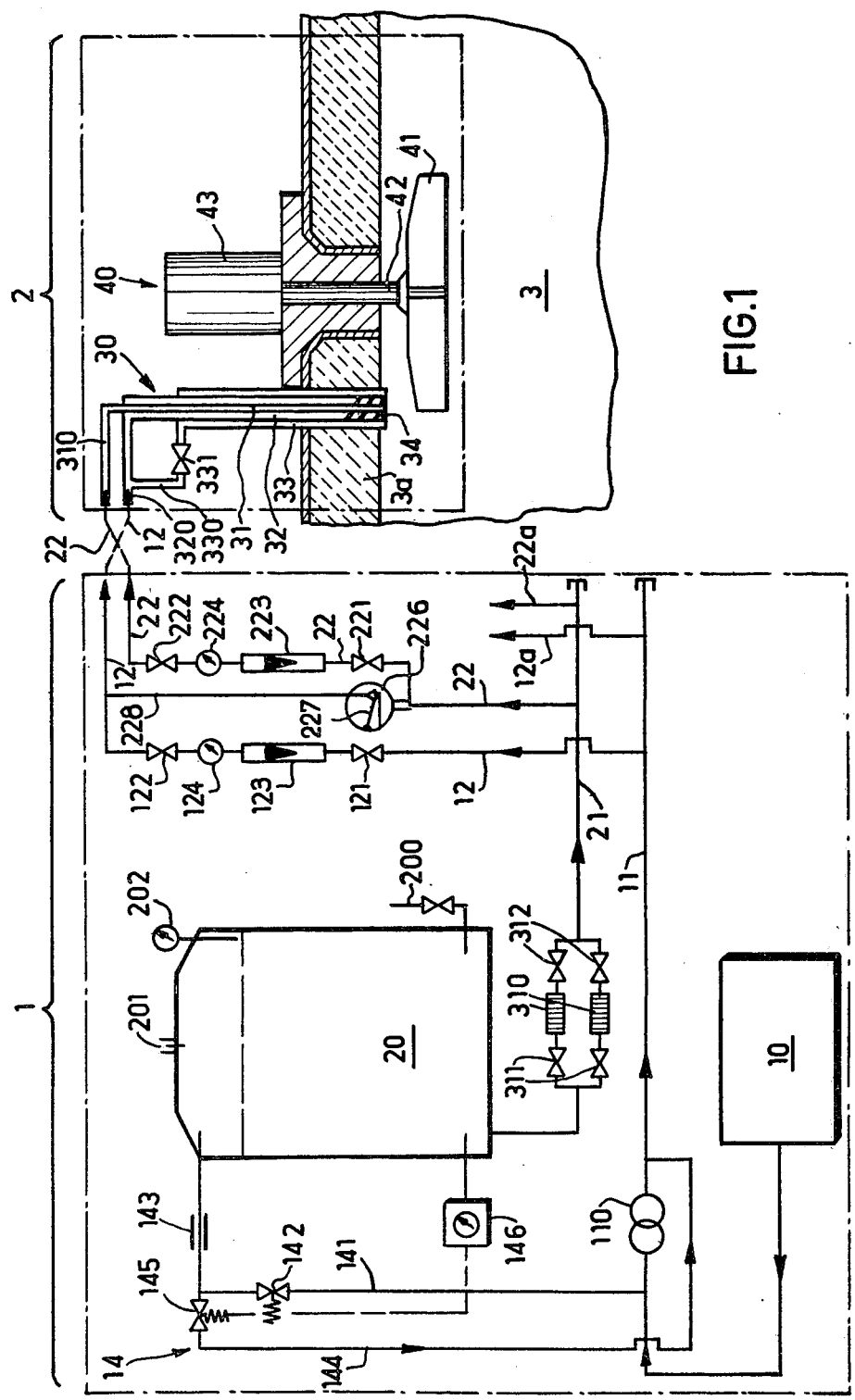
FIG. 1 illustrates a plant in accordance with the invention, provided with means for distributing nitrogen and alcohol in accordance with a first embodiment

Referring now to the drawings, and firstly to FIG. 1, it is apparent that the plant illustrated therein comprises feed devices denoted generally at 1, which are organised to feed at least two components of the mixture intended to be fed into the furnace, these components being nitrogen and alcohol. Distribution devices are shown generally at 2, these devices being connected to the feed device 1 and being arranged to perform the infeed of the said mixture into the furnace which is shown at 3.

The feed devices 1 include a source of nitrogen comprising a tank 10 in which the nitrogen is stored in the liquefied state under high pressure (of the order of 7 bars). A nitrogen addition circuit 11 is connected to the tank 10 and is fitted with a reducing valve 110 downflow of which the nitrogen is supplied under a reduced pressure (of the order of 1 bar).

The feed devices 1 also comprise a source of alcohol constituted by a tank 20 fitted with a filler valve 200, with a calibrated safety valve 201 and with a level indicator 202. The alcohol, for example methanol, is stored in the tank 20 in the liquid phase. An alcohol addition circuit 21 is connected to the base of the tank 20 and is supplied with alcohol by withdrawal. The circuit 21 includes an element for retaining solid impurities, comprising two filters 310 installed in parallel and equipped with shut-off valves 311 and 312. Although methanol is specifically referred to, any alcohol may be used that has the property of decomposing at the temperature of the furnace by cracking of its molecules to yield carbon monoxide and hydrogen.

The tank 20 is pressurised under a constant pressure of the order of 2 bars, by means of a pressurising branch 14 of the nitrogen circuit 11. The branch 14 comprises an inlet duct 141 provided with an electromagnetic inlet valve 142 and connected to the circuit 11 upstream of the reducing valve 110. A discharge duct 144 fitted with an electromagnetic discharge valve 145 is connected to the circuit 11 downstream of the reducing valve 110. These ducts communicate with the upper part of the tank 20 via a calibrated jet or nozzle 143. Th electromagnetic valves 142 and 145 are controlled by means of a pressostat 146 connected to the base of the tank 20.

When a minimum or maximum threshold is exceeded, the pressostat operates either the infeed of nitrogen by action on the electromagnetic valve 142, or the discharge of nitrogen which returns to the principal duct, by action on the electromagnetic valve 145. In both cases, the rate of delivery of nitrogen is limited by the calibrated jet 143. This arrangement enables the elimination of pressure and flow fluctuations during pressure increases and decreases, caused by temperature variations which are unavoidable with a tank situated in the open air, and greatly enhances the alcohol infeed and discharge operation. The positioning of the pressostat 146 close to the point of withdrawal renders it unaffected by the action of the level within the tank 20.

The two nitrogen and alcohol circuits 11 and 21 respectively, are divided into a plurality of identical derivation circuits 12, 22, 12a 22a, etc. . . . , of which each supplies one treatment furnace. Only the derivation circuits 12 and 22 connected, respectively, to the circuits 11 and 12 have been fully depicted in FIG. 1.

The nitrogen circuit 12 is equipped with elements for governing pressure and controlling flow rate, comprising a rotameter 123, a pressure gauge 124 and two valves 121 and 122. The alcohol circuit 22 is similarly fitted with a rotameter 223, a pressure gauge 224 and two valves 221 and 222. The circuit 22 moreover has connected to it a degassing device 226 provided with a bleed element 227 of the float type and in communication via a duct 228 with the nitrogen circuit 12, this device having the purpose of freeing the alcohol from the dissolved nitrogen it may contain.

The distribution devices 2 comprise an injector 30 arranged to feed the nitrogen and alcohol into the furnace 3 in the form of a mist of alcohol in a jet of nitrogen. The injector 30 comprises a central capillary passage 31 connected via a pipe 310 to the alcohol circuit 22 and two peripheral passages 32 and 33 co-axial with the passage 31 and connected to the nitrogen circuit 12, the passage 32 via a pipe 320 and the passage 33 via a pipe 330. At the extremity of the injector, between the tubes 31 and 32 is fitted a fluted nozzle 34 which causes the nitrogen jet to be rotated. The distribution devices 2 furthermore comprise a stirring impeller 40 situated close to the injector 30 and including blades 41 secured to a spindle 42 driven by a motor 43.

The nitrogen which flows at high speed in the passage 32 is allowed to enter in sufficient quantity to assure atomisation of the alcohol. In the passage 33 the complementary nitrogen flows at a lower speed because of the valve 331 in the pipe 330. This configuration enables a diffuse atomisation of the alcohol and offers the advantage of allowing operation to be carried out within a very wide range of flow-rate and of nitrogen-alcohol ratio. Furthermore, the peripheral flow of nitrogen in the passage 33 helps prevent premature cracking of the alcohol during its travel through the wall of the furnace 3, which cracking operation would have the result of causing the forming of tars and soot unavoidably clogging the pipes.

The positioning of the injector 30 close to the stirring impeller 40 directs gas flow along the wall 3a of the furnace 3, and thus assists in the rapid heating and cracking of the alcohol.

Figure 2:
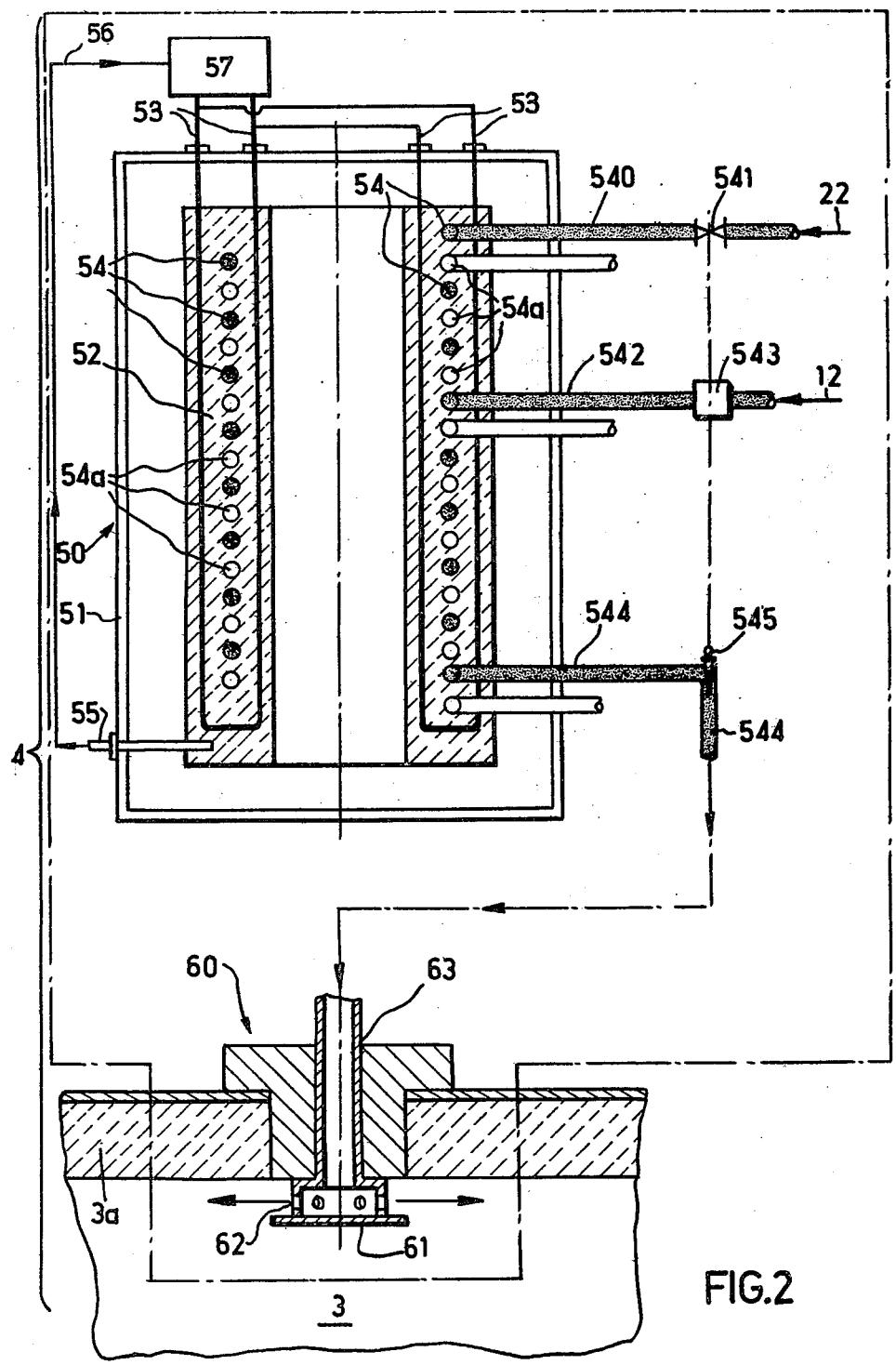
FIG. 2 shows a second embodiment of the distribution means.

Instead of a mist of alcohol in nitrogen, a gaseous alcohol-nitrogen mixture may be fed into the furnace 3, by utilising the distribution devices denoted generally at 4 in FIG. 2.

The devices 4 comprises a vapouriser-mixer 50 formed by a thermally insulated furnace 51 provided internally with a heat exchanger 52. The exchanger 52 comprises electrical heating resistances 53 controlled by a temperature pickup 55 which transmits signals to a regulator 57 via a conductor 56. The exchanger 52 also comprises a plurality of identical helical pipes 54, 54a, each being arranged for supplying one treatment furnace. The pipe 54 is connected at its top portion and by means of an intake pipe 540 fitted with an electromagnetic valve 541, to the nitrogen circuit 12 of the feed devices 1 (FIG. 1). The pipe 54 furthermore is connected at a level situated a few turns lower and by means of an intake pipe 542 provided with an electronic flow control 543, to the alcohol circuit 12 of the feed devices 1, this alcohol infeed level being selected in such manner that the temperature is at least equal to that of vapourisation of alcohol (65° C.). Finally, the pipe 54 is conneced to a discharge pipe 544 equipped with an electronic temperature detector pickup 545.

The mixture of nitrogen and alcohol vapours is heated to a higher temperature than the recondensation temperature of alcohol and lower than the temperature of initiation of alcohol cracking.

The signals supplied by the electronic flow control 543 and by the pickup 545 beyond a particular low temperature threshold operate the opening of the electromagnetic valve 541. These devices permit the transmission of alcohol into the furnace only when the pipe 54 has been preheated sufficiently, thus averting any risk of recondensation of the alcohol.

The electromagnetic valve 541 is also actuated by a signal supplied by the pickup 545 beyond a particular high temperature threshold to interrupt the injection of alcohol if the temperature reaches values corresponding to the initiation of alcohol cracking.

The distribution devices 4 moreover comprise a directional diffuser 60 arranged to feed the gaseous nitrogen-alcohol mixture supplied by the vapouriser-mixer 50, into the furnace 3. The diffuser 60 comprises a chamber 61 of circular cross-section situated in direct proximity to the wall 3a of the furnace 3 and having radial orifices 62 and with a feed pipe 63 connected to the discharge pipe 544 of the vapouriser-mixer 50. The gaseous mixture is thus impelled along the hot wall of the furnace 3, which assures rapid heating and cracking of the alcohol.

Apart from the aforesaid nitrogen-alcohol mixtures, the heat treatment atmospheres may comprise hydrocarbons (carburising) and if applicable ammonia (carbonitriding), and two complementary circuits are incorporated which are not illustrated in the drawings, each being intended for one of these components. These circuits may feed each furnace like 3 either directly or via the aforesaid nitrogen or alcohol circuits.

Two examples will hereinafter be described, for steel treatments performed in a furnace utilising an atmosphere supplied by a generating plant in accordance with the present invention.

EXAMPLE 1

Treatments for carburizing an XC10 steel were performed at 925° C. in a furnace having a rated gas flow of 17 m$^3$/hr by means of an atmosphere formed by the nitrogen-methanol mixture obtained by means of the above feed devices 1 and by a hydrocarbon consisting of $CH_4$, this atmosphere being fed into the furnace by means of an injector of the kind illustrated in FIG. 1. The rates of flow of nitrogen, of methanol and of $CH_4$ were adjusted, respectively, to 6.8 m$^3$/hr, 6 liters/hr and 0.2 m$^3$/hr.

The composition of the atmosphere within the furnace stabilised very rapidly at 40% of hydrogen and 20% of carbon monoxide, the residue being formed by nitrogen. The treatment was controlled whilst keeping the proportion of carbon dioxide at the outlet of the furnace at the value 0.18%.

EXAMPLE 2

Heating treatments prior to tempering of an XC38 steel were performed at 875° C. in a furnace having a rated gas flow of 8.3 m$^3$/hr, by means of an atmosphere formed solely by the nitrogen-methanol mixture obtained by means of the above feed devices 1, this atmosphere being fed into the furnace by means of the vapouriser-mixer illustrated in FIG. 2. The rates of flow of nitrogen and methanol were adjusted, respectively, to 5.8 m$^3$/hr and 1.5 liters/hr.

The composition of the atmosphere within the furnace included 20% of hydrogen and 10% of carbon monoxide. The treatment was controlled whilst keeping the proportion of steam at the outlet of the furnace at 0.55%, corresponding to the carbon potential in balance with the aforesaid steel.

We claim:

1. In a plant for generating an atmosphere in a heat treating furnace, in combination:
    a source of nitrogen under pressure;
    a nitrogen circuit connected to the source of nitrogen;
    a tank containing alcohol;
    an alcohol circuit connected to the tank;
    distribution means communicating with the nitrogen and alcohol circuits and with said furnace for simultaneously feeding nitrogen and alcohol thereto, the alcohol being fed to the furnace decomposing at the furnace temperature by cracking of its molecules to yield carbon monoxide and hydrogen;
    pressurizing means interconnecting the nitrogen circuit and the alcohol tank for supplying nitrogen thereto at a predetermined rate of flow to thereby maintain the alcohol in the tank under pressure; and
    control means cooperating with the pressurizing means for controlling the pressure and rate of flow of the pressurizing nitrogen being supplied to said tank.

2. In a plant as defined in claim 1, in combination:
    means cooperating with said alcohol circuit for reducing impurities in the alcohol being fed to said furnace.

3. In a plant for generating an atmosphere in a heat treating furnace, in combination:
    a source of nitrogen under pressure;
    a nitrogen circuit connected to said source;
    a tank containing alcohol;
    an alcohol circuit connected to the tank;
    distribution means communicating with the nitrogen and alcohol circuits and with said furnace for simultaneously feeding nitrogen and alcohol thereto, the alcohol being fed to the furnace decomposing at the furnace temperature by cracking of its molecules to yield carbon monoxide and hydrogen;

pressurizing means including inlet and outlet conduits connected to the alcohol tank for supplying pressurized nitrogen thereto to thereby maintain the alcohol in the tank under pressure; and control means cooperating with the pressurizing means for controlling the pressure and rate of flow of the pressurizing nitrogen being supplied to said alcohol tank, the control means including a valve in at least one of said conduits and means responsive to the alcohol pressure for adjusting said valve.

4. In a plant for generating an atmosphere in a heat treating furnace, in combination:

a source of nitrogen under pressure;

a nitrogen circuit to said source;

a tank containing alcohol;

an alcohol circuit connected to the tank;

distribution means communicating with the nitrogen and alcohol circuits and with said furnace for simultaneously feeding nitrogen and alcohol thereto, the alcohol being fed to the furnace decomposing at the furnace temperature by cracking of its molecules to yield carbon monoxide and hydrogen;

pressurizing means interconnecting the nitrogen circuit and the alcohol tank for supplying nitrogen thereto at a predetermined rate of flow to thereby maintain the alcohol in the tank under pressure, the pressurizing means having inlet and outlet valves and a calibrated nozzle for introducing nitrogen into the upper portion of said tank; and control means cooperating with the pressurizing means for controlling the pressure and rate of flow of the pressurizing nitrogen being supplied to said alcohol tank, the control means including means responsive to the alcohol pressure for adjusting each of said valves.

5. In a plant as defined in claim 4, in combination:

bleeding means connected to said alcohol circuit and in communication with said nitrogen circuit, said bleeding means venting nitrogen dissolved in the alcohol to said nitrogen circuit.

6. In a plant for generating an atmosphere in a heat treating furnace, in combination:

a source of nitrogen under pressure;

a nitrogen circuit connected to the source of nitrogen;

a tank containing alcohol;

an alcohol circuit connected to the tank;

distribution means communicating with the nitrogen and alcohol circuits and with said furnace for simultaneously feeding nitrogen and alcohol thereto, the alcohol being fed to the furnace decomposing at the furnace temperature by cracking of its molecules to yield carbon monoxide and hydrogen, said distribution means including an injector for introducing alcohol and nitrogen into said furnace in the form of a mist of alcohol in a jet of nitrogen;

pressurizing means interconnecting the nitrogen circuit and the alcohol tank for supplying nitrogen thereto to thereby maintain the alcohol in the tank under pressure; and control means cooperating with the pressurizing means for controlling the pressure and rate of flow of the pressurizing nitrogen being supplied to said tank.

7. In a plant as defined in claim 6, in combination, the injector comprising nozzle means having a central alcohol passage and a plurality of additional passages concentric with said central passage for introducing nitrogen into said furnace.

8. In a plant for generating an atmosphere in a heat treating furnace, in combination:

a source of nitrogen under pressure;

a nitrogen circuit connected to said source;

a tank containing alcohol;

an alcohol circuit connected to the tank;

distribution means communicating with the nitrogen and alcohol circuits and with said furnace for simultaneously feeding nitrogen and alcohol thereto, the alcohol being fed to the furnace decomposing at the furnace temperature by cracking of its molecules to yield carbon monoxide and hydrogen, said distribution means including an injector for introducing alcohol and nitrogen into said furnace and an impeller within said furnace in position to disperse the incoming alcohol and nitrogen;

pressurizing means interconnecting the nitrogen circuit and the alcohol tank for supplying nitrogen thereto at a predetermined rate of flow to thereby maintain the alcohol in the tank under pressure; and control means cooperating with the pressurizing means for controlling the pressure and rate of flow of the pressurizing nitrogen being supplied to said tank.

9. In a plant for generating an atmosphere in a heat treating furnace, in combination:

a source of nitrogen under pressure;

a nitrogen circuit connected to said source;

a tank containing alcohol;

an alcohol circuit connected to the tank;

distribution means including a vaporizer-mixer communicating with the nitrogen and alcohol circuits and with said furnace for feeding a gaseous mixture of nitrogen and alcohol thereto, the alcohol being fed to the furnace decomposing at the furnace temperature by cracking of its molecules to yield carbon monoxide and hydrogen;

pressurizing means interconnecting the nitrogen circuit and the alcohol tank for supplying nitrogen thereto to thereby maintain the alcohol in the tank under pressure; and control means cooperating with the pressurizing means for controlling the pressure and rate of flow of the pressurizing nitrogen being supplied to said tank.

10. In a plant as defined in claim 9, said distribution means further including a heat exchanger connected to the nitrogen and alcohol circuits.

11. In a plant as defined in claim 10, said distribution means further including means responsive to the temperature of the alcohol entering said furnace for controlling the flow of alcohol to said heat exchanger.

12. In a plant for generating an atmosphere in a heat treating furnace, in combination:

a source of nitrogen under pressure;

a nitrogen circuit connected to said source;

a tank containing alcohol;

an alcohol circuit connected to the tank;

distribution means including a vaporizer-mixer communicating with the nitrogen and alcohol circuits and with said furnace for feeding a gaseous mixture of nitrogen and alcohol thereto, the alcohol being fed to the furnace decomposing at the furnace temperature by cracking of its molecules to yield carbon monoxide and hydrogen, said distribution means having a directional diffuser connected to said vaporizer-mixer for directing said mixture toward at least one of the interior walls of said furnace;

pressurizing means interconnecting the nitrogen circuit and the alcohol tank for supplying nitrogen thereto at a predetermined rate of flow to thereby maintain the alcohol in the tank under pressure; and control means cooperating with the pressurizing means for controlling the pressure and rate of flow of the pressurizing nitrogen being supplied to said tank.

* * * * *